(12) United States Patent
Mori (10) Patent No.: US 11,691,459 B2
(45) Date of Patent: Jul. 4, 2023

(54) TIRE

(71) Applicant: Sumitomo Rubber Industries, Ltd., Kobe (JP)

(72) Inventor: Kazuma Mori, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 146 days.

(21) Appl. No.: 17/191,721

(22) Filed: Mar. 4, 2021

(65) Prior Publication Data

US 2021/0276369 A1    Sep. 9, 2021

(30) Foreign Application Priority Data

Mar. 6, 2020  (JP) ................................ 2020-039153

(51) Int. Cl.
*B60C 11/12*    (2006.01)
*B60C 11/00*    (2006.01)

(52) U.S. Cl.
CPC ...... *B60C 11/1236* (2013.01); *B60C 11/1218* (2013.01); *B60C 11/1263* (2013.01); *B60C 11/1272* (2013.01); *B60C 2011/0016* (2013.01); *B60C 2011/1213* (2013.01); *B60C 2011/1227* (2013.01)

(58) Field of Classification Search
CPC ......... B60C 2011/1213; B60C 11/1218; B60C 2011/1227; B60C 11/1263; B60C 11/12; B60C 2011/0016
See application file for complete search history.

(56) References Cited

U.S. PATENT DOCUMENTS

| 6,170,546 | B1 | 1/2001 | Koyama et al. |
| 2004/0216826 | A1 | 11/2004 | Metzger |
| 2007/0199634 | A1 | 8/2007 | Sakamaki |
| 2010/0212794 | A1 | 8/2010 | Watabe et al. |

(Continued)

FOREIGN PATENT DOCUMENTS

| DE | 1953940 A1 * | 5/1997 | ............. B60C 11/12 |
| DE | 19543940 A1 | 5/1997 | |

(Continued)

OTHER PUBLICATIONS

DE 19543940 Machine Translation; Lehman, Gabriele (Year: 1997).*

(Continued)

*Primary Examiner* — Robert C Dye
*Assistant Examiner* — Nicholas J Weiler
(74) *Attorney, Agent, or Firm* — Xsensus LLP (57) ABSTRACT

A tire comprises a tread portion. The tread portion is provided with a sipe. The sipe comprises four sipe segments: a first sipe segment, a second sipe segment, a third sipe segment, and a fourth sipe segment. At least one of the first sipe segment and the third sipe segment comprises an oscillated portion which extends in the radial direction of the tire, while oscillating in a lateral direction orthogonal to the length direction of the sipe in a cross section of the sipe orthogonal to the length direction. Each of the first sipe segment and the third sipe segment comprises the oscillated portion including an oscillating-start portion, and the oscillating-start portion of the first sipe segment is inclined with respect to the tire radial direction in the same direction as the oscillating-start portion of the third sipe segment.

19 Claims, 9 Drawing Sheets

(56) References Cited

U.S. PATENT DOCUMENTS

| | | | |
|---|---|---|---|
| 2012/0118457 | A1 | 5/2012 | Matrascia et al. |
| 2014/0290815 | A1* | 10/2014 | Tomida ............... B60C 11/1236 152/209.18 |
| 2015/0053321 | A1 | 2/2015 | Goncalves Ankiewicz et al. |
| 2015/0151586 | A1* | 6/2015 | Furusawa ............... B60C 11/11 152/209.25 |
| 2015/0266346 | A1 | 9/2015 | Kaji et al. |
| 2016/0052346 | A1 | 2/2016 | Jang et al. |
| 2017/0368883 | A1 | 12/2017 | Kigami |
| 2019/0210410 | A1* | 7/2019 | Tikka ................. B60C 11/0306 |

FOREIGN PATENT DOCUMENTS

| | | | | |
|---|---|---|---|---|
| EP | 2660080 | A1 | 11/2013 | |
| EP | 2660081 | A1 | 11/2013 | |
| EP | 3254872 | A1 * | 12/2017 | ........... B60C 11/033 |
| JP | 2004314758 | A * | 11/2004 | ......... B60C 11/1218 |
| JP | 2009-214697 | A | 9/2009 | |
| JP | 2011-105131 | A | 6/2011 | |
| JP | 2016-084082 | A | 5/2016 | |
| JP | 2016-088342 | A | 5/2016 | |
| JP | 2018-1803 | A | 1/2018 | |
| WO | 2009/077808 | A1 | 6/2009 | |
| WO | 2012/001488 | A1 | 1/2012 | |
| WO | 2020/059345 | A1 | 3/2020 | |

OTHER PUBLICATIONS

JP 2004-314758 Machine Translation; Saeki, Kentaro (Year: 2004).*
International Search Report dated Oct. 29, 2019, in corresponding PCT/JP2019/031046, 2 pages.
Extended European search report dated May 11, 2022, in corresponding European patent Application No. 19862350.6, 8 pages.
Office Action dated Oct. 5, 2022, in corresponding U.S. Appl. No. 17/275,228, 20 pages.

* cited by examiner

TIRE

CROSS REFERENCE TO RELATED APPLICATION

The present application claims priority to Japanese patent application JP 2020-39153, filed on Mar. 6, 2020, the entire contents of which is incorporated herein by reference in its entirety.

Technical Field

The present disclosure relates to a tire provided, in the tread portion, with sipes.

BACKGROUND ART

Prior Art Document

Patent Document
Patent Document 1: Japanese Patent Application Publication No. 2018-001803.

SUMMARY

The present disclosure can involve a tire comprising a tread portion, wherein
the tread portion is provided with a plurality of sipes adjacent to each other in the tire circumferential direction,
each of the plurality of sipes comprises a portion in which a plurality of repeat units is connected in series in the length direction of the sipe,
each of the repeat units is bent so that four sipe segments form acute angles with each other,
the above-said four sipe segments include
a first sipe segment extending in a tire axial direction,
a second sipe segment extending from an end in a first tire axial direction of the first sipe segment toward a first tire circumferential direction,
a third sipe segment extending in the first tire axial direction from the second sipe segment, and
a fourth sipe segment connected to the third sipe segment and extending from the third sipe segment toward a second tire circumferential direction opposite to the first tire circumferential direction,
each of the first sipe segment and the third sipe segment comprises, in the cross section orthogonal to the length direction, an oscillated portion which extends in a tire radial direction, while oscillating in a lateral direction orthogonal to the above-said length direction,
the oscillated portion comprises an oscillating-start portion which extends from the ground contacting surface of the tread portion toward the inside in the tire radial direction while inclining toward one side in the above-said lateral direction, and
the oscillating-start portion of the first sipe segment is inclined with respect to the tire radial direction in the same direction as the oscillating-start portion of the third sipe segment.

DETAILED DESCRIPTION

Hereinafter, an embodiment of the present disclosure will be described based on the drawings.

In general, a sipe extending in the axial direction of a tire tends to open widely when it goes out of the ground contact surface of the tread portion as the tire rotates. Such opening of the sipe increases the amount of slip between the edges of the sipe and the road surface, which, therefor, tends to cause uneven wear (for example, heel-and-toe wear) in the vicinities of the edges.

The present disclosure has been devised in view of the above problem and additional problems, and an objective of one or more objectives, thereof, is to provide a tire capable of exhibiting excellent on-ice performance and uneven wear resistance.

Figure 1:
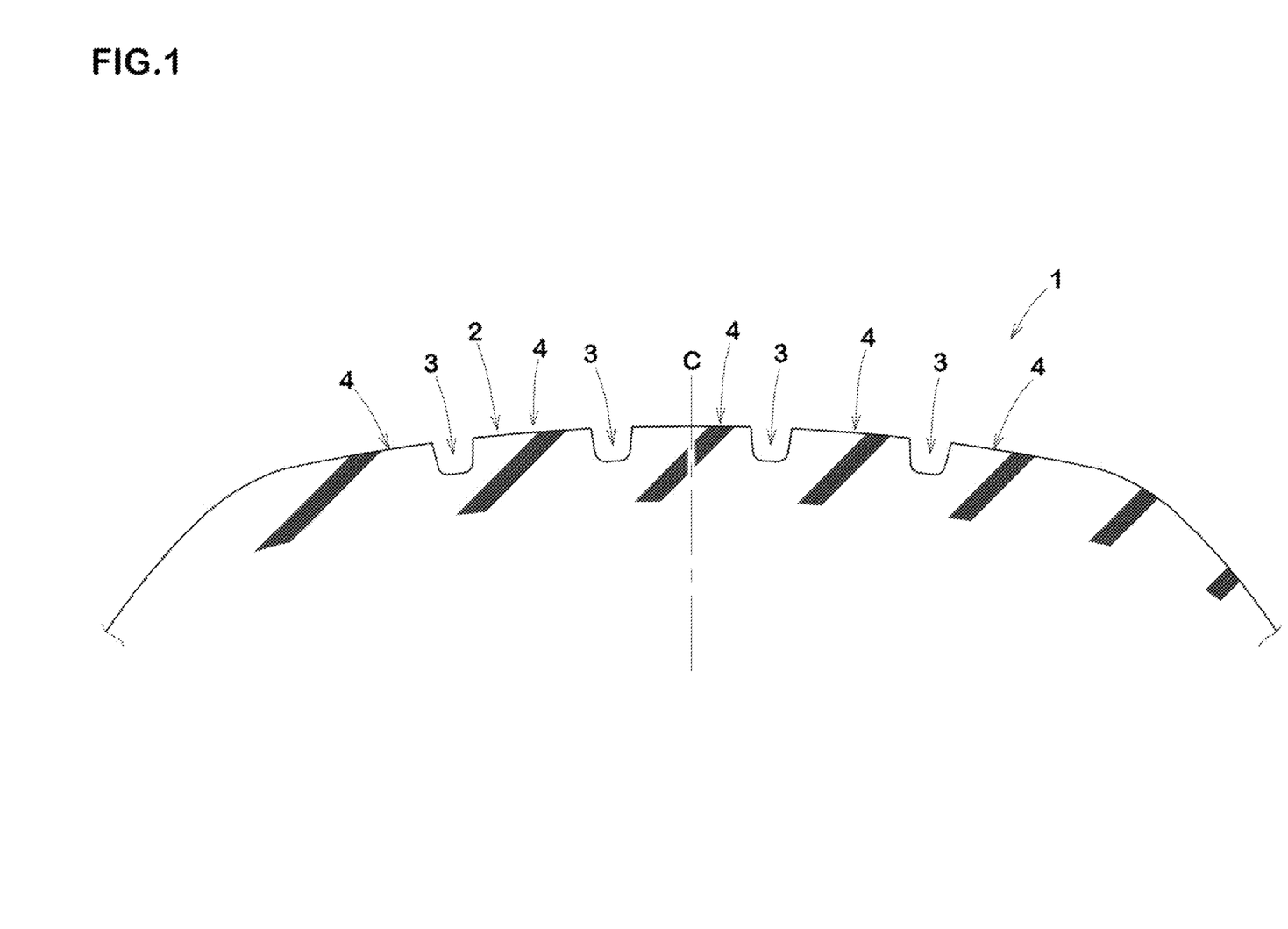
FIG. 1 is a cross-sectional view of a tread portion of a tire according to an embodiment of the present disclosure.

In FIG. 1, there is shown a cross-sectional view of a tread portion 2 of a tire 1 of the present embodiment. FIG. 1 is a meridian cross-sectional view of the tire 1 including the rotation axis of the tire 1 under a normal state. The tire 1 of the present embodiment is suitably used as, for example, a pneumatic tire for a passenger car. However, the present disclosure is not limited to such embodiment, and the tire 1 of the present disclosure may be used, for example, for a heavy load.

The "normal state" can be a no-load state in which the tire is mounted on a normal rim and is filled with a normal internal pressure.

Hereinafter, unless otherwise noted, dimensions and the like of any part of the tire are values measured in the normal state.

The "normal rim" can mean a rim specified for each tire in a standard system including a standard on which the tire is based, for example, "standard rim" in JATMA, "Design Rim" in TRA, "measuring Rim" in ETRTO.

The "normal internal pressure" can mean an air pressure specified for each tire in a standard system including a standard on which the tire is based, i.e., "maximum air pressure" in JATMA, a maximum value described in the table "TIRE LOAD LIMITS AT VARIOUS COLD INFLATION PRESSURES" in TRA, and "INFLATION PRESSURE" in ETRTO.

As shown in FIG. 1, the tread portion 2 is provided with, for example, a plurality of main grooves 3 continuously extending in the tire circumferential direction, and land portions 4 divided thereby.

Figure 2:
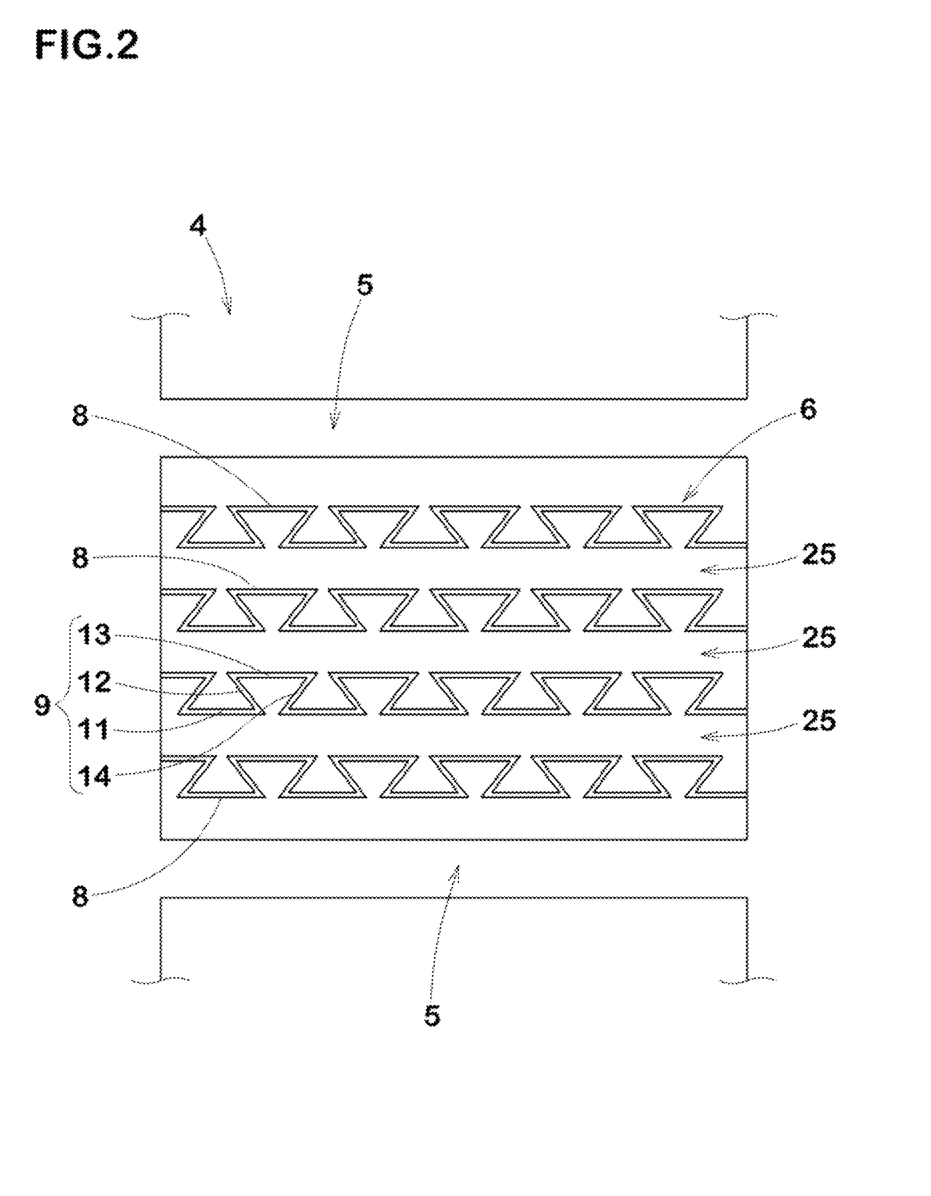
FIG. 2 is an enlarged plan view of a land portion of FIG. 2.

In FIG. 2, there is shown an enlarged plan view of a land portion 4.

As shown in FIG. 2, the land portion 4 of the present embodiment can be configured as, for example, a block row including a plurality of blocks 6 in the tire circumferential direction. The blocks 6 are divided between lateral grooves 5 which cross the land portion 4 in the tire axial direction.

Figure 3:
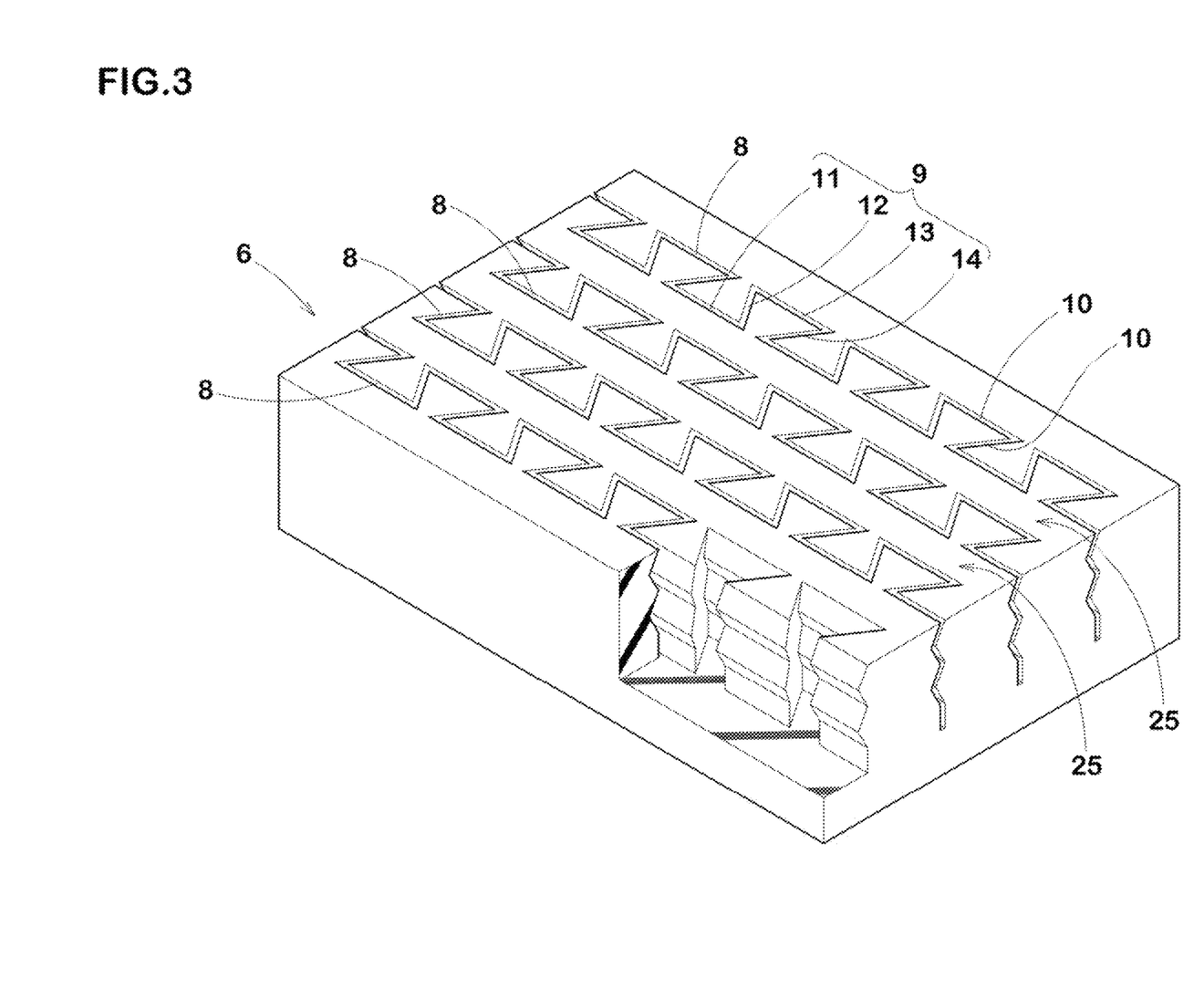
FIG. 3 is an enlarged perspective view of a block of FIG. 2.

In FIG. 3, there is shown an enlarged perspective view of a block 6. Incidentally, in FIG. 3, a part of the block 6 is cut out so that the disclosure can be easily understood. As shown in FIG. 3, the ground contacting surface of the tread portion 2 is provided with a plurality of sipes 8.

In this embodiment, a plurality of the sipes 8 are provided per one block 6. However, the present disclosure is not limited to such blocks, and for example, the sipe 8 may be provided on a rib continuously extending in the tire circumferential direction.

In the present specification, "sipe" can mean a cut having a width of not more than 1.5 mm. It can be desirable that the width of the sipe 8 is 0.2 to 0.5 mm, for example.

The sipe 8 comprises a portion in which a plurality of repeat units 9 are connected in series in the length direction of the sipe 8. Each of the repeat units 9 is bent so that four sipe segments 10 form acute angles with each other. Further, the four sipe segments 10 include a first sipe segment 11, a second sipe segment 12, a third sipe segment 13 and a fourth sipe segment 14.

Figure 4:
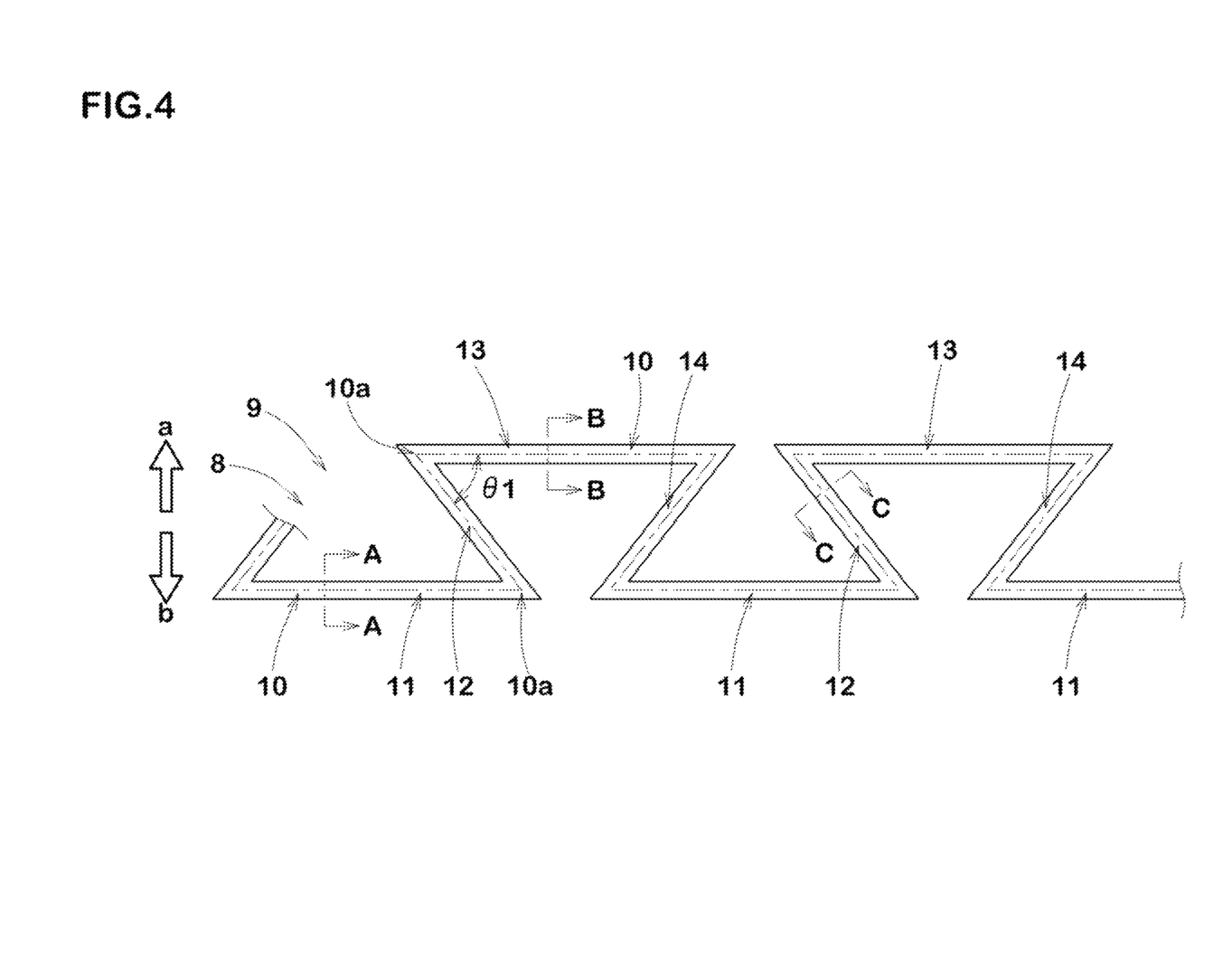
FIG. 4 is an enlarged view of the repeat units of a sipe of FIG. 3.

In FIG. 4, there are shown an enlarged view of the repeat units 9.

As shown in FIG. 4, the first sipe segment 11 extends in the tire axial direction. The second sipe segment 12 extends from an end in a first tire axial direction (rightward in FIG. 4) of the first sipe segment 11 toward a first tire circumferential direction "a" (upward in FIG. 4). The third sipe segment 13 extends in the first tire axial direction from the second sipe segment 12. The fourth sipe segment 14 is connected to the third sipe segment 13, and extends from the third sipe segment 13 toward a second tire circumferential direction "b" (downward in FIG. 4) which is opposite to the first tire circumferential direction.

In the repeat units 9 of the sipe 8 of the present disclosure, since the first sipe segments 11 and the third sipe segments 13 extend in the tire axial direction, it can be possible to provide a large frictional force in the tire circumferential direction when running on ice, and thereby braking performance on ice can be improved.

Figure 5:
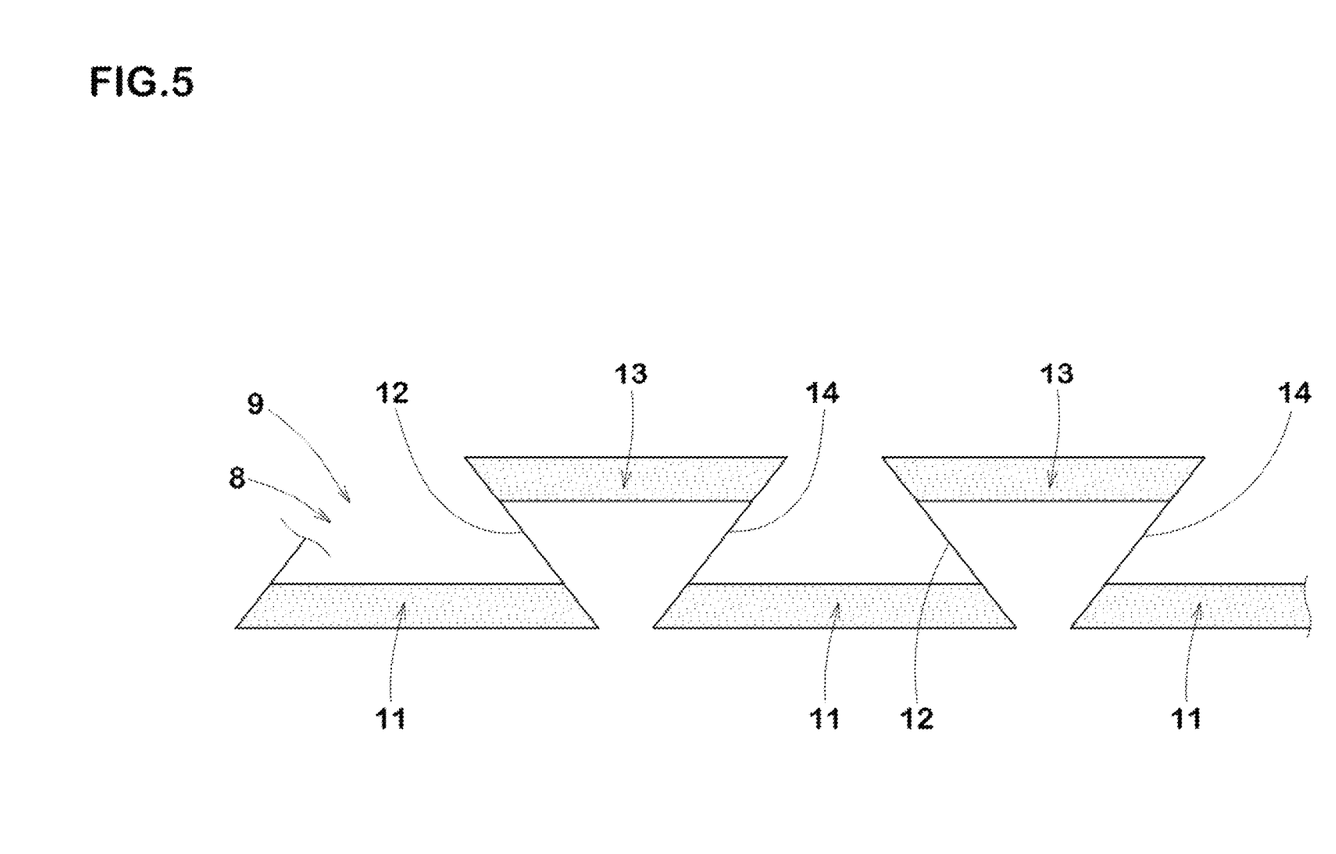
FIG. 5 is an enlarged view of the repeat units when the sipe is opened.

In FIG. 5, there is shown an enlarged view of the repeat units 9 when the sipe 8 is opened.

In FIG. 5, the opened areas of the repeat units 9 are colored so that the disclosure can be easily understood. As shown in FIG. 5, in the repeat units 9, when a shearing force in the tire circumferential direction is applied thereto, the sipe walls facing each other in the second sipe segment 12 and in the fourth sipe segment 14 come into contact with each other, and thus it is possible to prevent the first sipe segment 11 and the third sipe segment 13 from opening excessively. Such action can reduce the amount of slip between the road surface and the edges of the first sipe segment 11 and the third sipe segment 13 when the edges come free from the road surface. Therefore, uneven wear in the vicinities of the edges can be suppressed.

Figure 6:
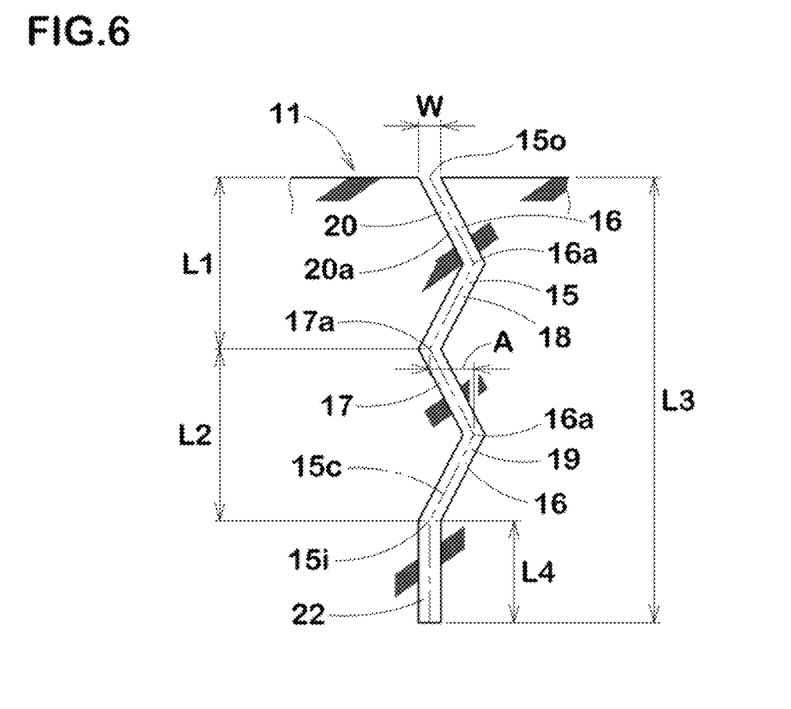
FIG. 6 is a cross-sectional view taken along line A-A of FIG. 4.
Figure 7:
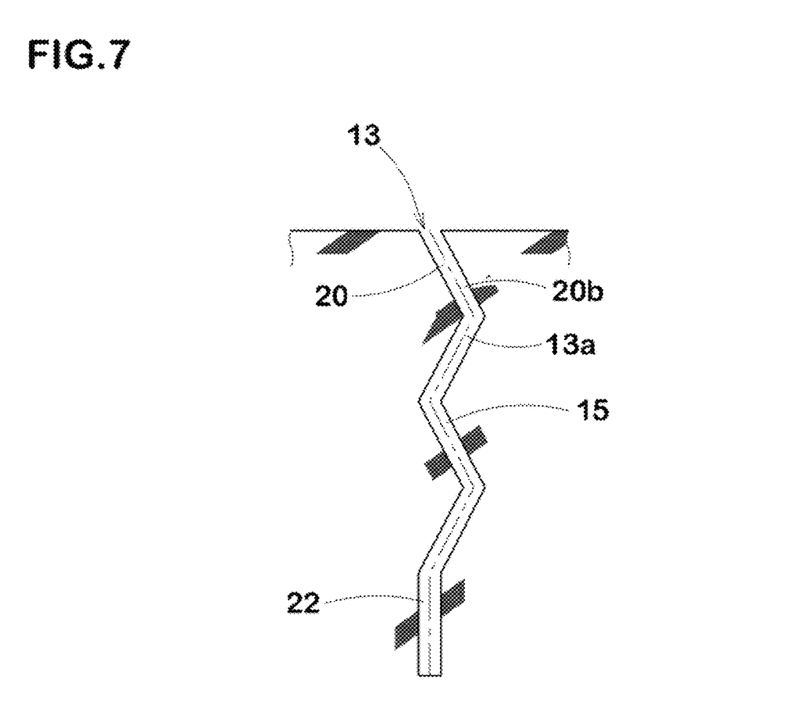
FIG. 7 is a cross-sectional view taken along line B-B of FIG. 4.
Figure 8:
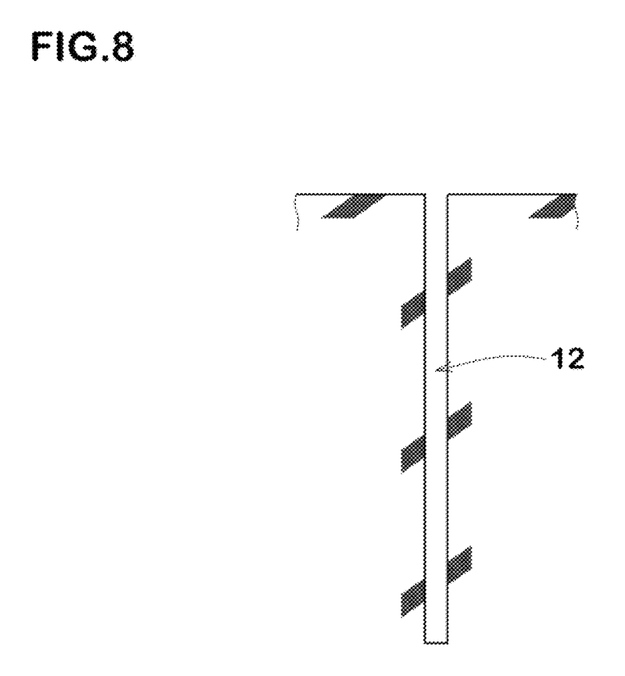
FIG. 8 is a cross-sectional view taken along line c-c of FIG. 4.

In FIG. 6, there is shown a cross-sectional view of the first sipe segment 11 taken along line A-A of FIG. 4. In FIG. 7, there is shown a cross-sectional view of the third sipe segment 13 taken along line B-B of FIG. 4.

As shown in FIG. 6 and FIG. 7, each of the first sipe segment 11 and the third sipe segment 13 comprises an oscillated portion 15 extending in a tire radial direction, while oscillating in a lateral direction orthogonal to the above-said length direction in the cross section orthogonal to the above-said length direction.

The oscillated portion 15 comprises an oscillating-start portion 20 which extends from the ground contacting surface of the tread portion 2 toward the inside in the radial direction of the tire while inclining toward one side in the lateral direction.

When the ground pressure acts on the tread portion 2, since the sipe walls facing each other come into contact with each other and engage with each other, the oscillated portion 15 can maintain the rigidity of the tread portion 2 in the tire circumferential direction. Therefore, the braking performance on ice can be further improved. In addition, such oscillated portion 15 can also improve steering stability on a dry road surface.

When a plurality of the sipes 8 are arranged in the tire circumferential direction, there is a possibility that the first sipe segment 11 and the third sipe segment 13 face each other. In such a case, there is a possibility that the width in the tire circumferential direction of the inter-sipe rubber 25 between the first sipe segment 11 and the third sipe segment 13 is varied in the tire radial direction due to the oscillated portions 15. If a portion having a small width is locally formed in the inter-sipe rubber 25 on the side of the ground contacting surface of the tread portion 2, uneven wear may occur starting from that portion.

In the tire 1 of the present disclosure, on the other hand, the oscillating-start portion 20a of the first sipe segment 11 is inclined in the same direction as the oscillating-start portion 20b of the third sipe segment 13 with respect to the tire radial direction. In the present embodiment, the oscillating-start portion 20a of the first sipe segment 11 and the oscillating-start portion 20b of the third sipe segment 13 are inclined toward the second tire circumferential direction (b) (correspond to the right side in FIG. 6 and FIG. 7), while extending from the tread toward the inside in the tire radial direction. Thereby, on the side of the ground contacting surface of the tread portion 2, the width in the tire circumferential direction of the inter-sipe rubber 25 is hard to vary along the tire radial direction, therefore, uneven wear can be suppressed. Further, owing to such effect, it can become possible to reduce the arrangement pitches in the tire circumferential direction for the sipes 8, to increase the number of the sipes 8, and thereby the on-ice performance can be improved.

It is desirable that the difference between the angle of the oscillating-start portion 20a of the first sipe segment 11 with respect to the tire radial direction, and the angle of the oscillating-start portion 20b of the third sipe segment 13 with respect to the tire radial direction is not more than 5 degrees. In the present embodiment, the oscillating-start portion 20a of the first sipe segment 11 can be arranged in parallel with the oscillating-start portion 20b of the third sipe segment 13. Thereby, the width of the inter-sipe rubber can become constant in the radial direction of the tire, and uneven wear can be further suppressed.

As shown in FIG. 4, the first sipe segment 11 and the third sipe segment 13 extend at an angle of not more than 35 degrees with respect to the tire axial direction, for example. The angles of the first sipe segment 11 and the third sipe segment 13 with respect to the tire axial direction are desirably not more than 15 degrees, and more desirably not more than 5 degrees.

The first sipe segment 11 and the third sipe segment 13 of the present embodiment as a more desirable embodiment extend parallel to the tire axial direction.

It can be desirable that the length of the first sipe segment 11 is the same as the length of the third sipe segment 13. Further, it can be desirable that the length of the second sipe segment 12 and the length of the fourth sipe segment 14 are smaller than, for example, the length of the first sipe segment 11 or the length of the third sipe segment 13. In the present embodiment, the length of the second sipe segment 12 can be the same as the length of the fourth sipe segment 14.

The repeat unit 9 of the present embodiment can be bent so that the four sipe segments 10 form angles θ1 of 30 to 70 degrees with each other. It may be more desirable that the angle θ1 is 30 to 40 degrees.

When the angles of the angled portions 10a formed by the respective sipe segments 10 are smaller than 30 degrees, the angled portions 10a may be reduced in the rigidity, and may tend to be reduced in the effect of suppressing the opening and displacement of the sipe 8. And there is a possibility that the frictional force in the tire axial direction provided by the repeat units 9 is reduced. Further, when the angles are larger than 70 degrees, the effect of suppressing the opening of the sipe 8 by the second sipe segment 12 and the fourth sipe segment 14 tends to become small.

In the present embodiment, the angles of the angled portions 10a formed by the respective sipe segments 10 can all be the same. However, the present disclosure is not limited to such embodiment.

As shown in FIG. 6 and FIG. 7, it can be desirable that each of the oscillated portions 15 extends in the tire radial direction in a zigzag shape from the outer surface of the tread portion 2. However, the present disclosure is not limited to such example, and each of the oscillated portions 15 may extend in a sinusoidal shape in the tire radial direction, for example.

The oscillated portion 15 of the first sipe segment 11 and the oscillated portion 15 of the third sipe segment 13 can be formed to have the same wavelength of oscillation and amplitude of oscillation. In an example, the oscillated portion 15 of the first sipe segment 11 and the oscillated portion 15 of the third sipe segment 13 can extend in the radial direction of the tire while oscillating in the same phase as each other. Here, the expression that the two oscillated portions 15 oscillate in the same phase can mean that the amount of displacement in the tire radial direction between a vertex of one of the oscillated portions 15 and the corresponding vertex of the other of the oscillated portions is not more than 0.20 times the length in the tire radial direction of a bent element including the vertex.

In the present embodiment, the above-said amount of displacement is set to 0 as a more desirable example, and the two oscillated portions 15s are arranged in exactly the same phase. This can make possible to increase the number of the sipes which can be arranged per a unit length of the block, therefore, it can be expected to improve braking performance on ice.

As shown in FIG. 6, it can be desirable that the oscillated portion 15 comprises two or more first convex portions 16 which are convex toward one side in the lateral direction. The oscillated portion 15 of the present embodiment is composed of the two first convex portions 16 and one second convex portion 17 which is convex toward the other side in the lateral direction between the two first convex portions 16. Such oscillated portion 15 can effectively suppress shear deformation of the block 6 when the sipe walls come into contact with each other.

The widthwise center line 15c of the oscillated portion 15 has a first vertex 16a at which a first convex portion 16 is bent, and a second vertex 17a at which a second convex portion 17 is bent. Further, it is desirable that a virtual straight line (not shown) drawn between both ends of the center line 15c of the oscillated portion 15 is parallel to the tire radial direction. Further, it is desirable that the second vertex 17a is positioned on the virtual straight line. As a result, the anisotropy of the rigidity of the block 6 in the tire circumferential direction is controlled. Further, the knife blade of the vulcanization mold forming the oscillated portion 15 is not easily deformed when it comes into contact with the raw rubber of the tire during vulcanization molding, and excellent moldability can be obtained.

The center line 15c of the oscillated portion 15 has an outer end 15o on the outer side in the radial direction of the tire and an inner end 15i on the inner side in the radial direction of the tire.

The oscillated portion 15 comprises a first bent element 18 from the outer end 15o to the second vertex 17a and a second bent element 19 from the second vertex 17a to the inner end 15i.

It can be desirable that the length L1 in the tire radial direction of the first bent element 18 is 0.8 to 1.2 times the length L2 in the tire radial direction of the second bent element 19. In the present embodiment, the length L1 is the same as the length L2. Such oscillated portion 15 can uniformly improve the traction performance and the braking performance on ice.

The lateral distance "A" from the first vertex 16a to the second vertex 17a can be, for example, 0.4 to 1.0 mm. Thereby, while exhibiting the above-mentioned effects, molding defects occurring around the sipes 8 during vulcanization molding can be suppressed.

It can be desirable that, on the inside in the tire radial direction of the oscillated portion 15, there is provided a linear bottom portion 22 extending therefrom in parallel to the tire radial direction. Thereby, at the time of vulcanization molding, the knife blade of the vulcanization mold forming the oscillated portion 15 can easily penetrate the raw rubber of the tire, and the deformation and damage of the knife blade are suppressed.

From the point of view of achieving both on-ice performance of the tire and moldability during vulcanization molding of the tire, it can be desirable that the length L4 in the tire radial direction of the linear bottom portion 22 is 0.10 to 0.30 times the length L3 in the tire radial direction of the sipe segment 10 to which the linear bottom portion 22 belongs.

Figure 10:
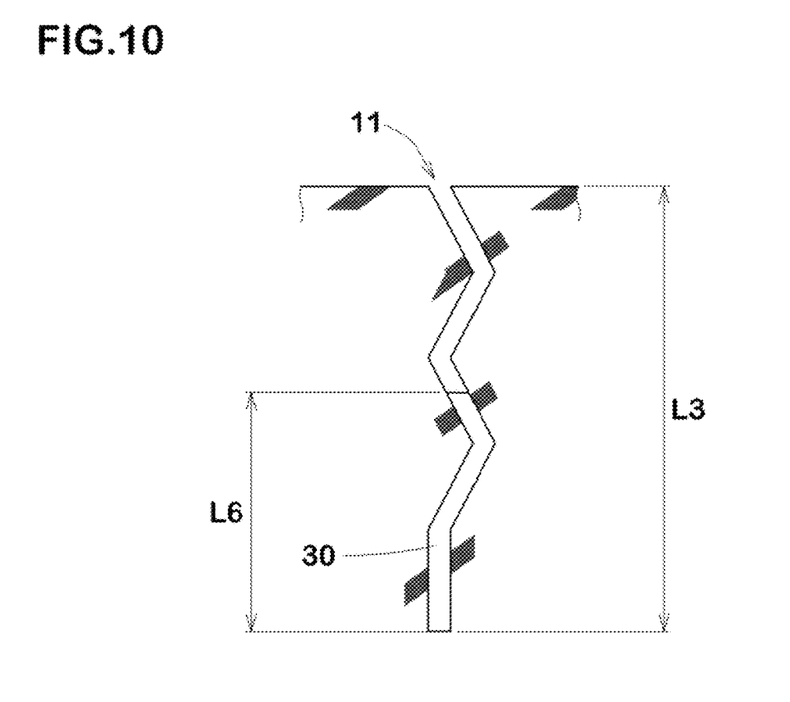
FIG. 10 is a cross-sectional view of the first sipe segment taken along line D-D of FIG. 9.

In FIG. 10, there is shown a cross-sectional view of the second sipe segment 12 taken along line c-c of FIG. 4.

As shown in FIG. 10, it is desirable that the second sipe segment 12 extends linearly in the radial direction of the tire. The same applies to the fourth sipe segment 14. Thereby, when the first sipe segment 11 and the third sipe segment 13 are opened, the sipe walls of the second sipe segment 12 and of the fourth sipe segment 14 can be easily brought into close contact with each other with a broad surface, therefore, the rigidity of the block 6 in the tire circumferential direction can be improved.

If the second sipe segment 12 and the fourth sipe segment 14 extend in a zigzag shape in the radial direction of the tire, there is a possibility that the gap between the sipe walls facing each other becomes large, and the rigidity of the block 6 in the tire circumferential direction may be decreased.

Incidentally, by using a knife blade including a portion extending in a zigzag shape, the sipe 8 of the present embodiment can be vulcanization molded through a well-known method.

Working Examples

Pneumatic tires of size 195/65R15 provided with the above-described sipes were experimentally manufactured based on specifications shown in Table 1.

As a comparative example 1, a tire in which the sipe did not have an oscillated portion and the entire sipe extended linearly in the radial direction of the tire, was experimentally manufactured.

As a comparative example 2, a tire in which the oscillated portion of the first sipe segment and the oscillated portion of the third sipe segment were arranged in opposite phases, was experimentally manufactured.

All the test tires had substantially the same configuration, except for the shape of the sipe.

Each test tire was tested for braking performance on ice, cornering performance on ice, steering stability on dry roads, and uneven wear resistance.

Specifications common to all the test tires and test methods are as follows.

Wheel rim: 15×6.0 JJ
Tire pressure: front 230 kPa, rear 230 kPa
Test vehicle: displacement 1500 cc, front-wheel drive vehicle
Tire mounting positions: all wheels <Braking Performance on Ice>

Braking performance when the test vehicle provided with the respective test tires was running on an icy road, was evaluated by the driver's feelings. The result is a score based on the braking performance of the comparative example 1 being 100, wherein the larger the value, the better the braking performance on ice.

<Cornering Performance on Ice>

Cornering performance when the test vehicle provided with the respective test tires was running on an icy road, was evaluated by the driver's feelings. The result is a score based on the cornering performance of the comparative example 1 being 100, wherein the larger the value, the better the cornering performance on ice.

<Steering Stability on Dry Roads>

Steering stability when the test vehicle provided with the respective test tires was running on a dry road surface, was evaluated by the driver's feelings. The result is a score based on the steering stability of the comparative example 1 being 100, wherein the larger the value, the better the steering stability on dry roads.

<Uneven Wear Resistance>

By the use of a wear energy measuring device, the wear energy of the sipe edge of each test tire was measured. The result is a reciprocal of the wear energy indicated by an index based on the comparative example 1 being 100, wherein the larger the value, the smaller the wear energy and the better the uneven wear resistance.

The test results are shown in Table 1.

TABLE 1

|  | comparative example 1 | comparative example 2 | working example 1 | working example 2 | working example 3 | working example 4 | working example 5 | working example 6 | working example 7 | working example 8 | working example 9 |
|---|---|---|---|---|---|---|---|---|---|---|---|
| presence or absence of oscillated portion | Absence | presence | presence | presence | presence | presence | presence | presence | presence | presence | presence |
| inclining diretions of oscillating-start portions | — | opposite | same | same | same | same | same | same | same | same | same |
| number of sipes per block | 3 | 3 | 4 | 3 | 3 | 3 | 3 | 4 | 4 | 4 | 4 |
| angle θ1 of angled portion (deg.) | 35 | 35 | 35 | 35 | 20 | 70 | 85 | 35 | 35 | 35 | 35 |
| distance A from first vertex to second vertex (mm) | 0 | 0.6 | 0.6 | 0.6 | 0.6 | 0.6 | 0.6 | 0.2 | 0.4 | 1.0 | 1.2 |
| braking performance on ice (score) | 100 | 110 | 112 | 110 | 106 | 107 | 105 | 107 | 110 | 109 | 108 |
| cornering performance on ice (score) | 100 | 110 | 112 | 110 | 104 | 110 | 110 | 112 | 112 | 112 | 112 |
| steering stability on dry roads (score) | 100 | 106 | 104 | 107 | 99 | 107 | 107 | 99 | 101 | 101 | 99 |
| uneven wear resistance (index) | 100 | 102 | 107 | 106 | 106 | 105 | 104 | 104 | 105 | 106 | 105 |

From the test results, it was confirmed that the working example tires were improved in the on-ice performance and uneven wear resistance performance as compared with the comparative example 1. Further, it was confirmed that the working example tires were improved in at least uneven wear resistance performance as compared with comparative example 2.

While detailed description has been made of a preferable embodiment of the present disclosure, the present disclosure can be embodied in various forms without being limited to the illustrated embodiment.

Since the sipe 8 of the above-described embodiment can be provided in land portions inclusive of blocks and circumferentially continuously extending ribs, of a pneumatic tire, for example, so called all-season tire. Here, all-season tires include those for various vehicles, e.g., passenger cars, SUVs, light trucks, heavy duty vehicles such as truck and bus, and the like.

In the case of all-season tires, it can be desirable that a tread rubber forming the tread portion and defining the ground contacting surface thereof is made of a rubber compound having a hardness in a range from 60 to 67 (Hs JIS A) when measured according to JIS K6301, and a glass transition temperature (Tg) in a range from −40 to −25 degrees C. when measured under the conditions of frequency 10 Hz, initial strain 10%, amplitude+/−0.5%, and heating rate 2 degrees C./min.

On the other hand, shoulder blocks are usually subjected to a relatively large load during braking, therefore, it is useful for the improvement of the braking performance to increase the rigidity in the tire circumferential direction of the shoulder blocks. Here, the shoulder blocks are the axially outermost blocks in the tread portion arranged in the tire circumferential direction along and adjacently to the tread edges of the tread portion.

As explained above, since the sipe 8 can increase the rigidity of the block as compared with conventional sipes, it is desirable that the sipes 8 are disposed in at least the shoulder blocks instead of conventional sipes.

Further, in order to further increase the rigidity of the block and thereby further improve the braking performance, it can be possible to provide an interconnection portion 30 for the sipe 8 for integrally connecting portions of a sipe segment 10. As an example, interconnection portions 30 may be upward-protruding projections or projecting portions. The interconnection portion 30 may be formed due to a slit at an end of a cutting blade that forms the sipe 8/sipe segments 10.

Figure 9:
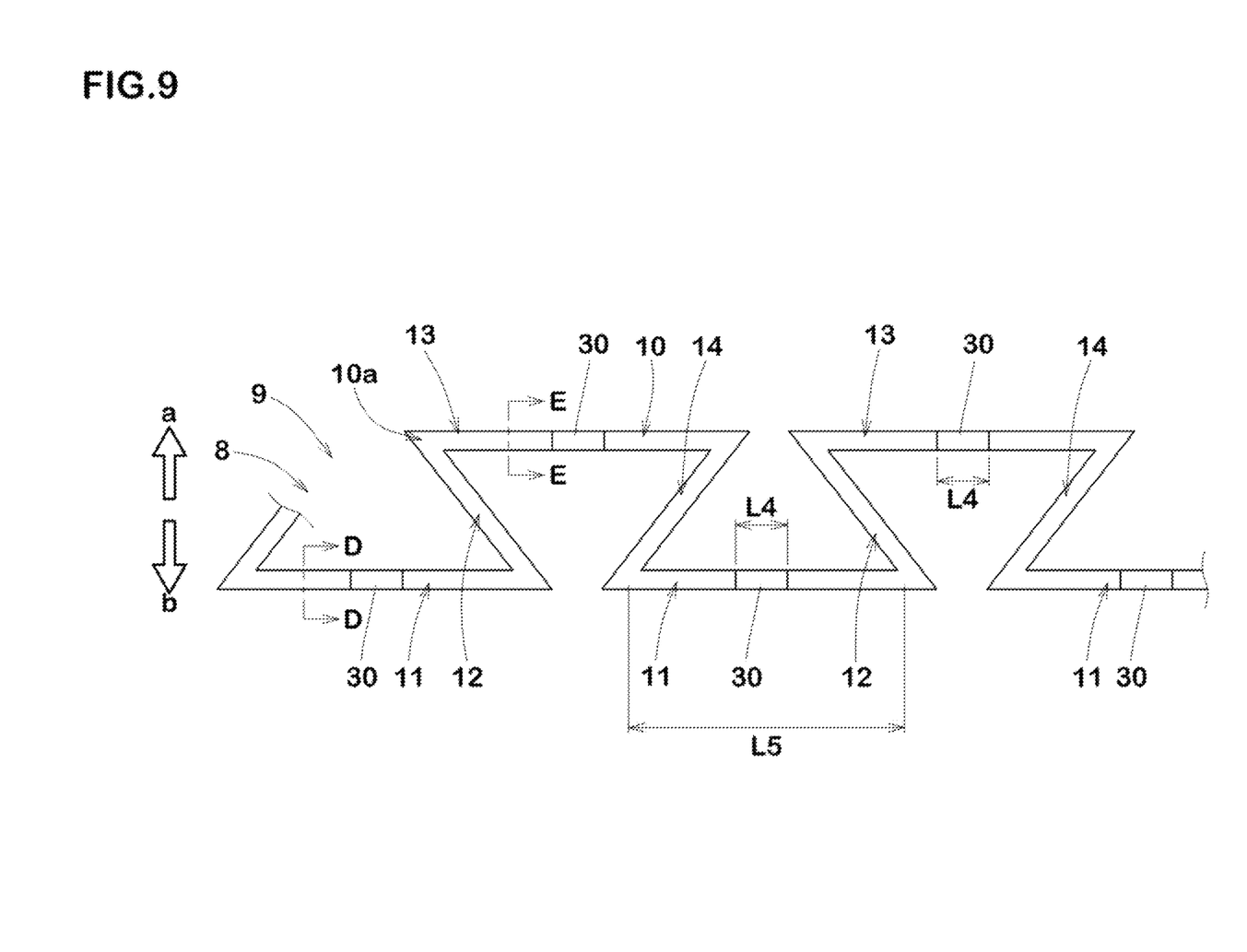
FIG. 9 is an enlarged view of a modified example of the sipe shown in FIG. 3.
Figure 11:
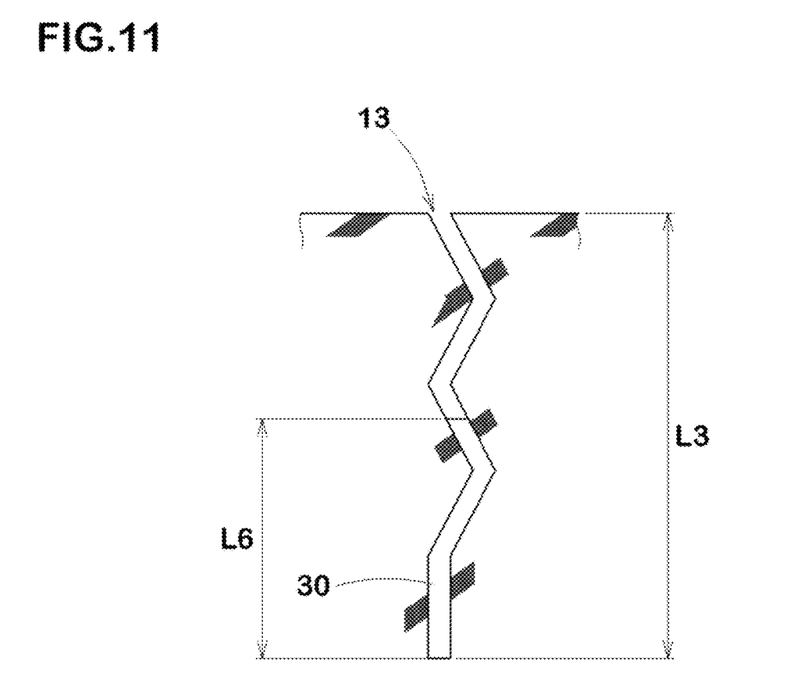
FIG. 11 is a cross-sectional view of the third sipe segment taken along line E-E of FIG. 9.

FIGS. 9, 10 and 11 show a modified example of the sipe 8 which is provided with such interconnection portions 30.

As shown, the interconnection portion 30 can protrude radially outwardly from the bottom of the sipe 8 and connect between the sipe walls facing each other.

In order to increase the rigidity in the tire circumferential direction of the block, it can be desirable that at least one of, preferably each of the first sipe segment 11 and the third sipe segment 13 is provided with the interconnection portion 30.

When the interconnection portion 30 is provided in the first or third sipe segment 11 or 13, the dimension L4 of the interconnection portion 30 measured along the length direction of the first or third sipe segment 11 or 13, can be set in a range of from 10% to 50% of the length L5 of the first or third sipe segment 11 or 13, as an example. And the dimension L6 of the interconnection portion 30 measured in the tire radial direction can be set in a range of from 10% to 90% of the depth L3 of the first or third sipe segment 11 or 13, as an example.

When the interconnection portion 30 is provided in each of the first and third sipe segments 11 and 13, it can be preferable that the radial dimension L6 of the interconnection portion 30 of the first sipe segment 11 is the same as that of the third sipe segment 13.

Such sipes 8 with the interconnection portions 30 can be provided in the shoulder blocks. In this case, blocks other than the shoulder blocks can be provided with the sipes 8 with the interconnection portions 30, but may be provided with the above-described sipes 8 without the interconnection portions 30. Thereby, a relatively wide opening can be secured, and the traction performance and braking performance can be achieved in a well-balanced manner.

In the tire of the present disclosure, it can be desirable that the difference between an angle of the oscillating-start portion of the first sipe segment with respect to the tire radial direction, and an angle of the oscillating-start portion of the third sipe segment with respect to the tire radial direction is not more than 5 degrees.

In the tire of the present disclosure, it can be desirable that the oscillating-start portion of the first sipe segment is arranged parallel to the oscillating-start portion of the third sipe segment.

In the tire of the present disclosure, it can be desirable that the oscillated portion of the first sipe segment and the oscillated portion of the third sipe segment extend in the tire radial direction, while oscillating in the same phase as each other.

In the tire of the present disclosure, it can be desirable that the oscillated portion comprises two or more first convex portions which are convex toward one side in the above-said lateral direction.

In the tire of the present disclosure, it can be desirable that the oscillated portion is composed of the above-said two first convex portions and one second convex portion which is convex toward the other side in the lateral direction between the two first convex portions.

In the tire of the present disclosure, it can be desirable that the widthwise center line of the oscillated portion comprises an outer end on the outer side in the tire radial direction, an inner end on the inner side in the tire radial direction, a first vertex at which a first convex portion bends, and a second vertex at which a second convex portion bends. The oscillated portion can comprise: a first bent element from the outer end to the second vertex and a second bent element from the second vertex to the inner end, and the length in the tire radial direction of the first bent element can be the same as the length in the tire radial direction of the second bent element.

In the tire of the present disclosure, it can be desirable that a distance in the lateral direction from the first vertex to the second vertex is 0.4 to 1.0 mm.

In the tire of the present disclosure, it can be desirable that a linear bottom portion extending parallel to the tire radial direction is connected to an inner side in the tire radial direction of the oscillated portion.

In the tire of the present disclosure, it can be desirable that a length in the tire radial direction of the linear bottom portion is 0.10 to 0.30 times a length in the tire radial direction of the sipe segment to which the linear bottom portion belongs.

In the repeat units of the sipe provided in the tread portion of the tire of the present disclosure, since the first sipe segment and the third sipe segment can extend in the tire axial direction, a large frictional force in the tire circumferential direction can be provided when running on ice, therefore, it can be possible to improve the braking performance on ice.

Further, in the repeat units, when a shearing force in the tire circumferential direction is applied thereto, the sipe walls facing each other in the second sipe segment and in the fourth sipe segment come into contact with each other, and thereby, the first sipe segment and the third sipe segment can be prevented from opening excessively. Such function can reduce the amount of slip between the road surface and the edges of the first sipe segment and the third sipe segment when the edges are separated from the road surface. Therefore, uneven wear in the vicinities of the edges can be suppressed.

In the tire of the present disclosure, each of the first sipe segment and the third sipe segment can comprise the oscillated portion which extends in the radial direction of the tire, while oscillating in the lateral direction orthogonal to the length direction of the sipe in the cross section of the sipe orthogonal to the length direction.

The oscillated portion can maintain the rigidity in the tire circumferential direction of the tread portion because the sipe walls facing each other come into contact with each other and engage with each other when the ground pressure acts on the tread portion. Therefore, the braking performance on ice can be further improved.

When a plurality of the sipes are arranged in the tire circumferential direction, there can be a possibility that the first sipe segment and the third sipe segment face each other. In such a case, there can be a possibility that the width in the tire circumferential direction of a rubber piece (hereinafter referred to as inter-sipe rubber) existing between the first sipe segment and the third sipe segment vary along the tire radial direction due to the oscillated portion. If a portion having a small width is locally formed in the inter-sipe rubber on the side of the ground contacting surface of the tread portion, uneven wear may occur starting from that portion.

In the tire of the present disclosure, on the other hand, the oscillating-start portion of the first sipe segment can be inclined in the same direction as the oscillating-start portion of the third sipe segment with respect to the tire radial direction. Thereby, on the side of the ground contacting surface of the tread portion, the width in the tire circumferential direction of the inter-sipe rubber can be hard to vary along the tire radial direction, therefore, uneven wear can be suppressed.

Further, owing to such effect, it can become possible to reduce the arrangement pitches in the tire circumferential direction for the sipes, to increase the number of the sipes, and thereby the on-ice performance can be improved.

The invention claimed is:

1. A tire comprising a tread portion provided with a plurality of sipes adjacent to each other in a circumferential direction of the tire, wherein
    each of the sipes comprises a portion in which a plurality of repeat units is connected in series in a length direction of the sipe,
    each of the repeat units is bent so that four sipe segments form acute angles with each other, said four sipe segments include:
        a first sipe segment extending in a tire axial direction,
        a second sipe segment extending from an end of the first sipe segment in a first tire circumferential direction,
        a third sipe segment extending in the tire axial direction from the second sipe segment, and
        a fourth sipe segment connected to the third sipe segment and extending from the third sipe segment in a second tire circumferential direction opposite the first tire circumferential direction,
    each of the first sipe segment and the third sipe segment comprises, in a cross section orthogonal to the length direction, an oscillated portion which extends in a tire radial direction, while oscillating in a lateral direction orthogonal to said length direction,
    the oscillated portion comprises an oscillating-start portion which extends from a ground contacting surface of the tread portion toward an inside in the tire radial direction while inclining toward one side in said lateral direction, and the oscillating-start portion of the first sipe segment is inclined with respect to the tire radial direction in a same direction as the oscillating-start portion of the third sipe segment, and
    only the first and third sipes have the oscillated portion, and each of the second sipe segment and the fourth sipe segment extend only in the tire radial direction and do not have the oscillated portion.

2. The tire according to claim 1, wherein
    a difference between an angle of the oscillating-start portion of the first sipe segment with respect to the tire radial direction and an angle of the oscillating-start portion of the third sipe segment with respect to the tire radial direction is not more than 5 degrees.

3. The tire according to claim 1, wherein
    the oscillating-start portion of the first sipe segment is arranged parallel to the oscillating-start portion of the third sipe segment.

4. The tire according to claim 1, wherein
    the oscillated portion of the first sipe segment and the oscillated portion of the third sipe segment extend in the tire radial direction, while oscillating in a same phase as each other.

5. The tire according to claim 1, wherein
    the oscillated portion comprises two or more first convex portions which are convex toward one side in said lateral direction.

6. The tire according to claim 5, wherein
    the oscillated portion is composed of said two or more first convex portions and one second convex portion which is convex toward the other side in the lateral direction between the two first convex portions.

7. The tire according to claim 6, wherein
    a widthwise center line of the oscillated portion comprises:
        an outer end on an outer side in the tire radial direction,
        an inner end on an inner side in the tire radial direction,
        a first vertex at which a first convex portion bends, and
        a second vertex at which a second convex portion bends, the oscillated portion comprises:
            a first bent element from the outer end to the second vertex and a second bent element from the second vertex to the inner end, and
            a first length in the tire radial direction of the first bent element is the same as a second length in the tire radial direction of the second bent element.

8. The tire according to claim 7, wherein
    a distance in the lateral direction from the first vertex to the second vertex is 0.4 to 1.0 mm.

9. The tire according to claim 1, wherein
    a linear bottom portion extending parallel to the tire radial direction is connected to an inner side in the tire radial direction of the oscillated portion.

10. The tire according to claim 9, wherein
    a first length in the tire radial direction of the linear bottom portion is 0.10 to 0.30 times a second length in the tire radial direction of the sipe segment to which the linear bottom portion belongs.

11. The tire according to claim 1, wherein
    at least some of the sipes are each provided with interconnection portions protruding radially outwardly from the bottoms of the respective sipes and connecting between sipe walls facing each other.

12. The tire according to claim 11, wherein
    the interconnection portions are provided in either the first sipe or the third sipe segments.

13. The tire according to claim 11, wherein
    the interconnection portions are provided in both of the first and the third sipe segments.

14. The tire according to claim 11, wherein
    the interconnection portions are provided in the first sipe segments, and dimensions of the interconnection portions measured along the length direction of the respective first sipe segments are in a range of from 10% to 50% of lengths of the respective first sipe segments.

15. The tire according to claim 14, wherein
    dimensions of the interconnection portions measured in the tire radial direction are in a range of from 10% to 90% of the depths of the respective first sipe segments.

16. The tire according to claim 11, wherein
the tread portion includes blocks each provided with the sipes, and
a tread rubber forming the tread portion and defining the ground contacting surface thereof is made of a rubber compound having a hardness in a range from 60 to 67 (Hs), and a glass transition temperature (Tg) in a range from −40 to −25 degrees C.

17. The tire according to claim 1, wherein
the oscillating start portion and the oscillating end portion are aligned with each other in the tire radial direction.

18. The tire according to claim 1, wherein
each bend associated with convex portions of the oscillated portion has an obtuse angle in a side cross-sectional view of the tire.

19. A tire comprising a tread portion provided with a plurality of sipes adjacent to each other in a circumferential direction of the tire, wherein
each of the sipes comprises a portion in which a plurality of repeat units is connected in series in a length direction of the sipe,
each of the repeat units is bent so that four sipe segments form acute angles with each other, said four sipe segments include:
a first sipe segment extending in a tire axial direction,
a second sipe segment extending from an end of the first sipe segment in a first tire circumferential direction,
a third sipe segment extending in the tire axial direction from the second sipe segment, and
a fourth sipe segment connected to the third sipe segment and extending from the third sipe segment in a second tire circumferential direction opposite the first tire circumferential direction,
each of the first sipe segment and the third sipe segment comprises, in a cross section orthogonal to the length direction, an oscillated portion which extends in a tire radial direction, while oscillating in a lateral direction orthogonal to said length direction,
the oscillated portion comprises an oscillating-start portion which extends from a ground contacting surface of the tread portion toward an inside in the tire radial direction while inclining toward one side in said lateral direction, and the oscillating-start portion of the first sipe segment is inclined with respect to the tire radial direction in a same direction as the oscillating-start portion of the third sipe segment, and
of the plurality of sipes, only the first and third sipes have the oscillated portion per repeat unit.

* * * * *